US011789767B2

(12) United States Patent
Vyas et al.

(10) Patent No.: US 11,789,767 B2
(45) Date of Patent: *Oct. 17, 2023

(54) COOPERATIVE CLOUD INFRASTRUCTURE USING BLOCKCHAINS FOR HARDWARE OWNERSHIP AND ACCESS

(71) Applicant: Red Hat, Inc., Raleigh, NC (US)

(72) Inventors: Jay Vyas, Concord, MA (US); Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,947

(22) Filed: May 27, 2022

(65) Prior Publication Data

US 2022/0291942 A1 Sep. 15, 2022

Related U.S. Application Data

(63) Continuation of application No. 16/733,753, filed on Jan. 3, 2020, now Pat. No. 11,347,535, which is a
(Continued)

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/45587* (2013.01); *G06F 2009/45595* (2013.01)

(58) Field of Classification Search
CPC .............. G06F 9/45558; G06F 9/5077; G06F 2009/45587; G06F 2009/45595
See application file for complete search history.

(56) References Cited

U.S. PATENT DOCUMENTS

| | | | |
|---|---|---|---|
| 9,027,087 B2 | 5/2015 | Ishaya et al. | |
| 2016/0300234 A1* | 10/2016 | Moss-Pultz | ............. G06F 21/64 |
| 2018/0137306 A1* | 5/2018 | Brady | ................... H04L 9/0643 |

FOREIGN PATENT DOCUMENTS

AU 2016100059 A4 3/2016

OTHER PUBLICATIONS

Buccafurri et al., Accountability-Preserving Anonymous Delivery of Cloud Services, Lecture Notes in Computer Science, vol. 9264, Aug. 5, 2015 (12 pages).
(Continued)

*Primary Examiner* — Wissam Rashid
(74) *Attorney, Agent, or Firm* — K&L Gates LLP

(57) ABSTRACT

A system includes a memory, a processor in communication with the memory, a hypervisor executing on the processor, a pool of hypervisor resources, and a cloud-sharing module (CSM). The CSM runs in a kernel to assign an anonymous identity to a hypervisor resource from the pool of hypervisor resources. The CSM broadcasts a transaction for the hypervisor resource and determines which provider owns the hypervisor resource. A first provider is associated with a second anonymous identity and a second provider is associated with a third anonymous identity. Additionally, the CSM receives mining information that includes a block associated with the transaction, where the block is part of a blockchain. The CSM completes the transaction for the first anonymous identity associated with the hypervisor resource between the second anonymous identity and the third anonymous identity.

20 Claims, 5 Drawing Sheets

Related U.S. Application Data continuation of application No. 15/497,429, filed on Apr. 26, 2017, now Pat. No. 10,528,377.

(56) References Cited

OTHER PUBLICATIONS

Nakamoto, Satoshi, Bitcoin: A Peer-to-Peer Electronic Cash System, published 2008 (9 pages).

* cited by examiner

COOPERATIVE CLOUD INFRASTRUCTURE USING BLOCKCHAINS FOR HARDWARE OWNERSHIP AND ACCESS

CROSS REFERENCES TO RELATED APPLICATIONS

This application is a continuation U.S. patent application Ser. No. 16/733,753, filed on Jan. 3, 2020, which is a continuation U.S. patent application Ser. No. 15/497,429, filed on Apr. 26, 2017, now U.S. Pat. No. 10,528,377, issued on Jan. 7, 2020, the entire contents of which are hereby incorporated by reference.

BACKGROUND

Cloud computing systems typically involve internet-based computing that provides access to a pool of computing resources such as physical machines and hardware devices. Access to machines may be provided on-demand and the shared computer processing resources may be provisioned and released as needed. As demand increases, users or companies providing services to customers (e.g., providers) may require additional computing resources to provide the appropriate processing bandwidth and data to computers and other devices on demand. Providers may increase their computing capabilities by increasing the amount of resources in their pool of resources on the cloud. Accordingly, cloud computing allows providers to scale their processing resources based on forecasting. Cloud computing may be used for email services, social applications, media services, content distribution, financial applications, and other web applications.

SUMMARY

The present disclosure provides new and innovative systems and methods for transferring hardware ownership and access using blockchains in a cooperative cloud infrastructure. In an example, a system includes a memory, a processor in communication with the memory, a hypervisor executing on the processor, a pool of hypervisor resources, and a cloud-sharing module. The cloud-sharing module runs in a kernel to assign a first anonymous identity to a hypervisor resource from the pool of hypervisor resources. The cloud-sharing module broadcasts a transaction for the hypervisor resource and determines which provider from a plurality of providers owns the hypervisor resource. A first provider is associated with a second anonymous identity and a second provider is associated with a third anonymous identity. Additionally, the cloud-sharing module receives mining information from at least one resource of the pool of hypervisor resources. The mining information includes a block associated with the transaction, and the transaction is represented within the block in a blockchain. The cloud-sharing module completes the transaction for the first anonymous identity associated with the hypervisor resource between the second anonymous identity and the third anonymous identity.

In an example, a method includes assigning, by a cloud-sharing module, a first anonymous identity to a hypervisor resource from a pool of hypervisor resources. The cloud-sharing module broadcasts a transaction for the hypervisor resource and determines which provider from a plurality of providers owns the hypervisor resource. A first provider is associated with a second anonymous identity and a second provider is associated with a third anonymous identity. Additionally, the cloud-sharing module receives mining information from at least one resource of the pool of hypervisor resources. The mining information includes a block associated with the transaction and wherein the transaction is represented within the block in a blockchain. The cloud-sharing module completes the transaction for the first anonymous identity associated with the hypervisor resource between the second anonymous identity and the third anonymous identity.

In an example, a non-transitory machine-readable medium stores code, which when executed by a processor, causes a cloud-sharing module to assign a first anonymous identity to a hypervisor resource from a pool of hypervisor resources. The cloud-sharing module broadcasts a transaction for the hypervisor resource and determines which provider from a plurality of providers owns the hypervisor resource. A first provider is associated with a second anonymous identity and a second provider is associated with a third anonymous identity. Additionally, the cloud-sharing module receives mining information from at least one resource of the pool of hypervisor resources. The mining information includes a block associated with the transaction, and the transaction is represented within the block in a blockchain. The cloud-sharing module completes the transaction for the first anonymous identity associated with the hypervisor resource between the second anonymous identity and the third anonymous identity.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
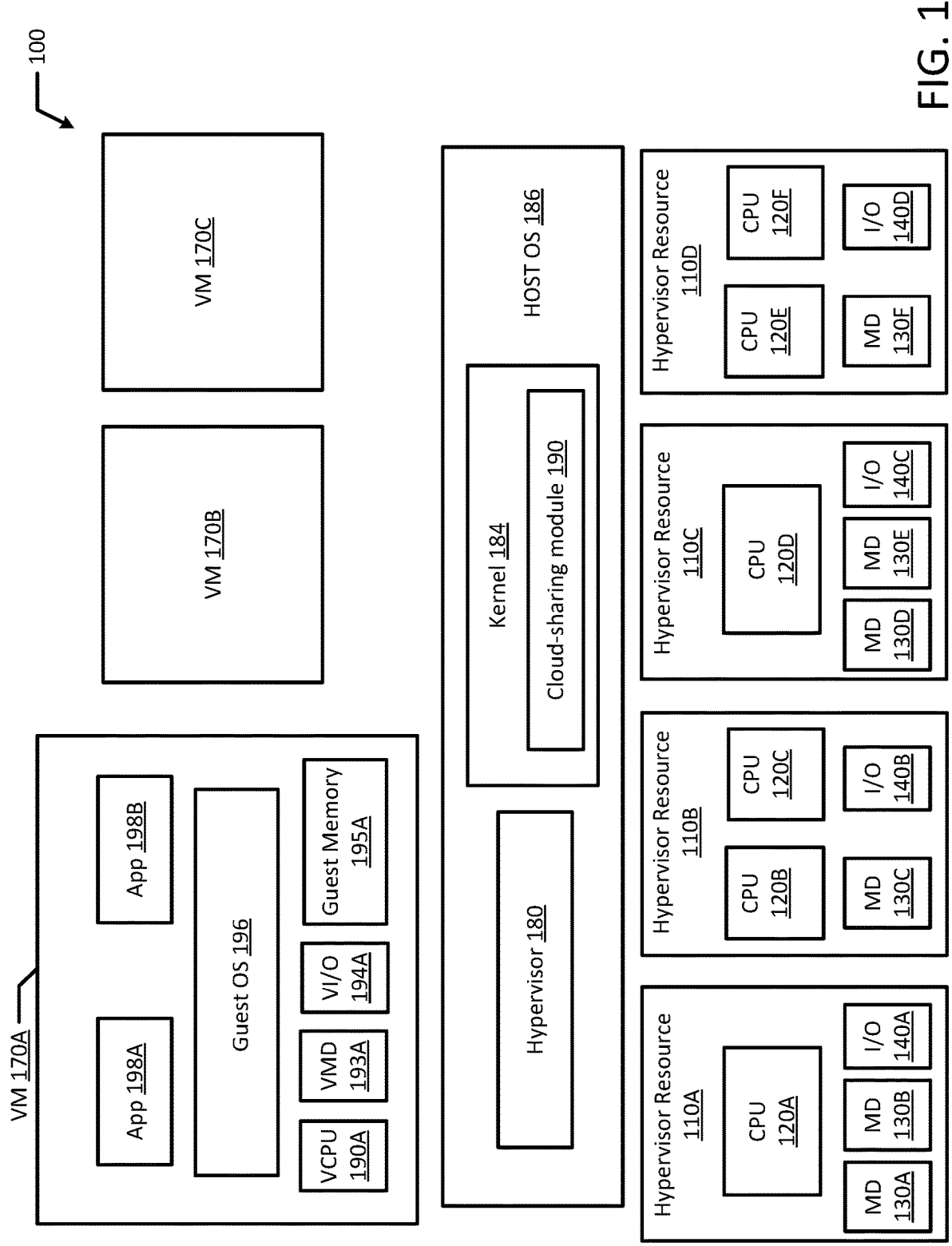
FIG. 1 illustrates a block diagram of an example cloud infrastructure system according to an example embodiment of the present disclosure.

Techniques are disclosed for using blockchains for transferring hardware ownership and access in a cooperative cloud infrastructure. Enterprise clouds have difficulty deciding how much hardware they need. Enterprise clouds can estimate needs based on forecasting and projections, however, these projections are only estimates and may not account for sudden surges or drops in demand, or unexpected hardware failure. Unfortunately, enterprise clouds may not be able to share resources and machines due to security and ownership constraints. Even if resource sharing was possible, enterprises may not want other enterprises to know how many machines they are using at a given time. For example, knowing an enterprise's current machine usage may reveal competitive business information. However, enterprises that have idle or unused resources, may want to anonymously share these resources in a cloud with other enterprises to receive a benefit (e.g., bartering benefit or monetary benefit) by renting, selling, or leasing these unused machines to other enterprises.

Current enterprise sharing techniques include ad hoc sharing in which different enterprises coordinate to share resources in an ad hoc manner. However, ad hoc sharing is inherently insecure and has no mechanism to incentivize contributors to add high quality hardware to the system. Conversely, a cooperative cloud infrastructure using blockchains for hardware ownership and access can be used, which advantageously enables anonymous ownership and transfer of resources. Additionally, the cooperative cloud infrastructure using blockchain incentivizes adding machines to the pool of resources by providing an economic benefit as the machines may be used to mine for blockchain solutions and rented to other providers using the cloud. Solving for blocks and renting machines may provide assets, such as cloud credits, to the owner of the machine. Thus, the cloud infrastructure system using blockchain may advantageously scale and grow as the cloud computing market demands.

As discussed herein, a provider may include an enterprise that utilizes cloud computing to provide services to customers. For example, a provider may be an online retailer, a media streaming company, a bank, etc. These providers may use an enterprise cloud provided by a vendor. Additionally, a provider may include anyone that currently has control of a resource, such as a hypervisor resource, on the cloud. For example, a provider (e.g., online retailer) may have a contract with a vendor to use the vendor's cloud infrastructure or services.

As discussed in the various example embodiments disclosed herein, systems and methods for transferring ownership and access using blockchains in an cooperative cloud infrastructure enable anonymous resource sharing and promotes vendors and/or providers to build a cloud that is scaled without the need for a central authority (e.g., governing authority of the cloud). For example, the system and methods disclosed herein make global system resources completely transparent across availability zones while strictly enforcing a blockchain based protocol for ownership, thereby allowing anonymity while preventing hardware theft. For example, a cloud-sharing module, which runs in the kernel, provides an anonymous address generation service for hypervisors that can be used to assign anonymous identities to hypervisor resources. Anonymous address generation allows vendors and/or providers to anonymously create requests for hardware, which they may or may not own. Additionally, the cloud-sharing module has the ability to determine if the hypervisor resource is currently being operated by the correct provider by looking up its state in a global blockchain of machine entries. Therefore, at any point in time, ownership of machines or resources may be confirmed. The cloud-sharing module enables all machines cooperating in the cloud to validate transactions between two anonymous identities (e.g., company or provider IDs) and an anonymous machine identity (e.g., hypervisor resource IDs). By enabling anonymous transactions, providers and even competitors can enter into transactions without obtaining competitive information or a competitive advantage. For example, anonymous transfers prevent providers from knowing how many machines a competitor is using or has available and may also prevent a provider from over-charging a competitor to rent one of their machines. Additionally, the cloud-sharing module enables the transfer of assets to the current anonymous identity which owns the machine (e.g., hypervisor resource), which allows vendors and/or providers to safely and anonymously exchange ownership of machines, thereby incentivizing vendors and/or providers to add resources to the cloud.

By using blockchains to confirm and transfer hardware ownership and access, each machine cooperating in the cloud can validate transactions. Blockchain systems store the global state of the system across a number of devices. An example blockchain system is Bitcoin. A combination of keys (e.g., public and private) and hashing provides a mechanism to store a ledger or blockchain that is distributed to various nodes or machines. Nodes or machines update their local state based on hashing algorithms applied to the system as a whole. Thus, the blockchain system provides a secure mechanism for establishing ownership and validating transactions across many devices.

FIG. 1 depicts a high-level component diagram of an example cloud infrastructure system 100 in accordance with one or more aspects of the present disclosure. The cloud infrastructure system 100 may include an operating system (OS) 186, one or more virtual machines (VM 170A-C), hypervisor resources (e.g., hypervisor resources 110A-D), and a hypervisor (e.g., hypervisor 180). The kernel 184 may be a program. For example, the kernel 184 may be a program that constitutes the core of the OS 186. As used herein, the kernel 184 may refer to a privileged software component of the OS 186 and may control processes within applications (e.g., Applications 198A-B). For example, the kernel 184 may perform several tasks such as executing processes and handling interrupts.

An application (e.g., Applications 198A-B) may be an application in a virtual machine, or an application located elsewhere. As used herein, an application (e.g., Applications 198A-B) may refer to less privileged software. The kernel 184 may provide basic services for the OS 186 that are requested by other parts of the OS 186 or by application programs. For example, the kernel 184 may provide basic services such as memory management, process management, file management, and I/O management.

In various examples, the kernel 184 may include cloud-sharing module 190. In an example, the cloud-sharing module 190 may be a program that allows the OS 186 and/or kernel 184 to interact with hypervisor resources (e.g., hypervisor resources 110A-110D). The cloud-sharing module 190 may also be configured to assign anonymous identities ("IDs"), broadcast transactions between providers, confirm ownership, and complete transactions. The cloud-sharing module advantageously enables the anonymous transfer of resources, which allows enterprises to adjust their computing bandwidth without adding additional machines to the cloud. In an example, an enterprise cloud may be made up of infrastructure and resources provided by the cloud vendor, which are then sold or rented to various providers. In another example, an enterprise cloud may allow providers to add infrastructure and resources to the cloud. For example, a provider (e.g., an online retailer) may temporarily rent machines or resources from another provider or the cloud vendor without permanently dedicating additional resources to the cloud. For example, for a temporary or short term need, a provider may advantageously rent machines from another provider to increase computing resources.

As noted above, cloud infrastructure system 100 may run multiple virtual machines (e.g., VM 170A-C), by executing a software layer (e.g., hypervisor 180) above the hardware and below the virtual machines 170A-C, as schematically shown in FIG. 1. In an example, the hypervisor 180 may be a component of the host operating system 186 executed by the cloud infrastructure system 100. In another example embodiment, the hypervisor 180 may be provided by an application running on the operating system 186, or may run directly on the cloud infrastructure system 100 without an operating system beneath it. The hypervisor 180 may virtualize the physical layer, including processors, memory, and I/O devices, and present this virtualization to virtual machines 170A-C as devices, including virtual processors (e.g., VCPU 190A), virtual memory devices (e.g., VMD 193A), and/or virtual I/O devices (e.g., VI/O 194A). It should be appreciated that VM 170B and VM 170C may include one or more VCPUs, VMDs, and/or VI/O devices.

In an example, a virtual machine 170A may execute a guest operating system 196 which may utilize the underlying VCPU 190A, VMD 193A, and VI/O device 194A. One or more applications 198A-B may be running on a virtual machine 170A under the respective guest operating system 196. A virtual machine (e.g., VM 170A-C, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications run on a second virtual machine (e.g., VM 170B) are independent of the underlying hardware and/or OS 186A. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications run on another virtual machine 170B are incompatible with the underlying hardware and/or OS 186A. In an example embodiment, a device may be implemented as a virtual machine (e.g., virtual machine 170A-C).

The cloud infrastructure system 100 may include one or more interconnected nodes. Each node may be a hypervisor resource 110A-D, which may in turn include one or more physical processors (e.g., CPU 120A-F) communicatively coupled to memory devices (e.g., MD 130A-F) and input/output devices (e.g., I/O 140A-D). Each hypervisor resource 110A-D may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-F refers to a volatile or non-volatile memory device, such as RAM, ROM, EEPROM, or any other device capable of storing data. As discussed herein, I/O device 140A-D refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-F and a memory device 130A-F may be provided by one or more local buses of suitable architecture, for example, peripheral component interconnect (PCI).

Figure 2:
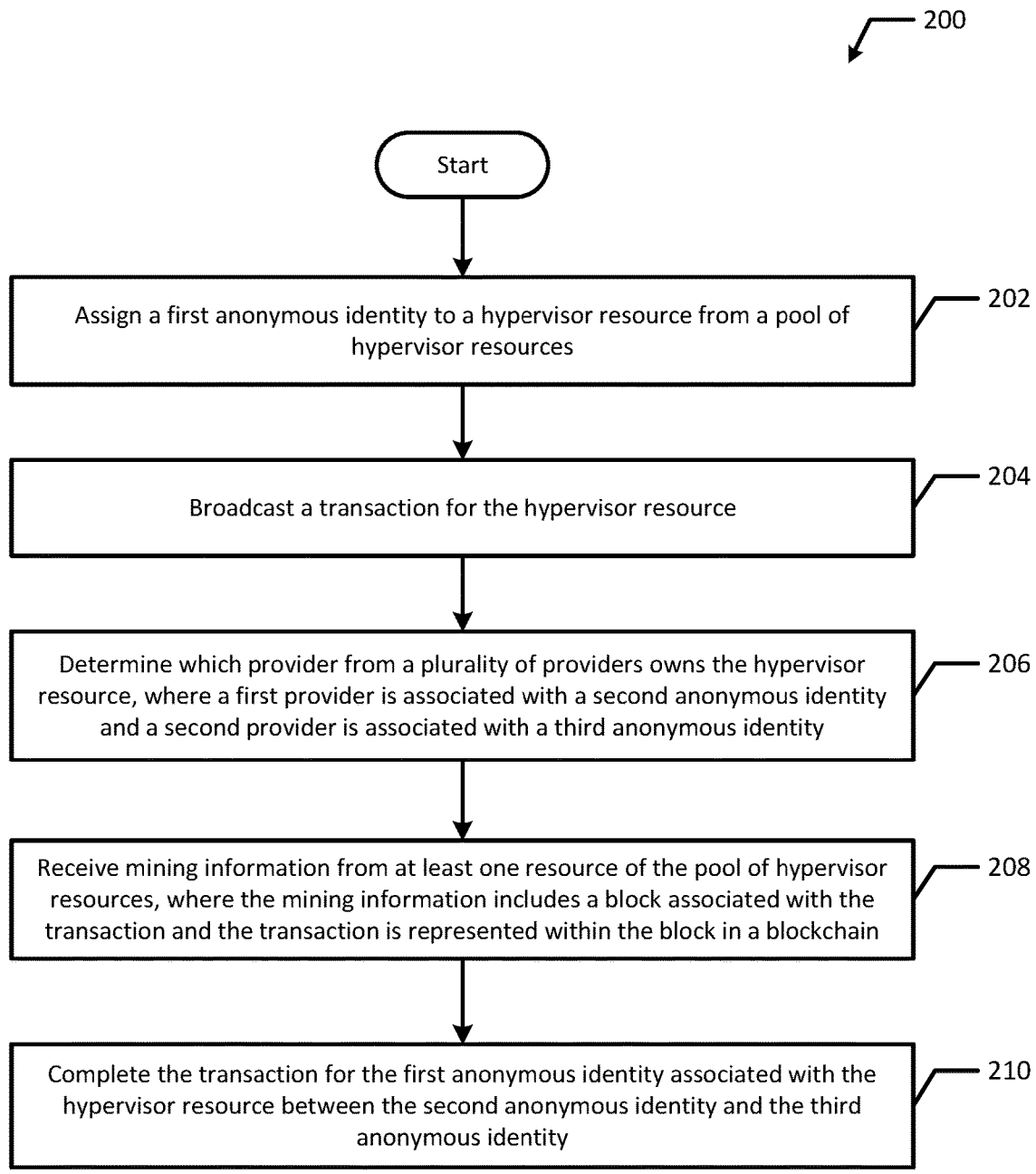
FIG. 2 illustrates a flowchart of an example process for transferring hardware ownership and access using blockchain according to an example embodiment of the present disclosure.

FIG. 2 illustrates a flowchart of an example method 200 for transferring hardware ownership and access using blockchains in a cooperative cloud infrastructure in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes a cloud-sharing module assigning an anonymous identity to a hypervisor resource from a pool of hypervisor resources (block 202). For example, when hypervisor resources (e.g., hypervisor resource 110D) are added to the pool of hypervisor resources (e.g., hypervisor resource 110A-D, MD 130E, or CPU 120F), the cloud-sharing module 190 may assign an anonymous identity to the hypervisor resource, for example, hypervisor resource 110D, hereinafter hypervisor resource 110. The anonymous ID may be a random string generated by a hashing function, such as a cryptographically-safe hash function, a random number generator, or the like. In an example, each hypervisor resource 110 (e.g., physical machine) and enterprises consuming such machines, such as providers, are associated with an anonymous ID. Vendors may offer various hypervisor resources 110 they own to providers to perform cloud computing tasks within the cloud. Based on current or expected computing needs, vendors may want to add additional hypervisor resources 110 to the cloud to sell, rent, or least to providers. Additionally, providers may want to acquire additional hypervisor resources 110 from the vendor or other providers on the cloud. Similarly, a provider may want to rent out idle/unused hypervisor resources 110 to other providers on the cloud.

Vendors and providers may enter into anonymous transactions to exchange ownership of hypervisor resources. For example, for short term needs, providers may advantageously rent available resources from the cloud vendor or another provider utilizing the cloud without dedicating more of their own physical machines to the cloud. Similarly, a cloud vendor may re-acquire idle resources originally sold or leased to providers, so that it can offer those resources to other providers needed additional resources without dedicating more physical machines to the cloud.

Then, the cloud-sharing module broadcasts a transaction for the hypervisor resource (block 204). For example, the cloud-sharing module 190 may broadcast the transaction for the hypervisor resource 110 to the pool of hypervisor resources (e.g., hypervisor resource 110A-D). Additionally, the cloud-sharing module 190 may broadcast the transaction to other machines that interact with the cloud. For example, vendors or providers may have additional machines that interact with the cloud that are not cloud resources (e.g., machines outside the pool of hypervisor resources 110A-D). Broadcasting may be achieved through peer-to-peer ("P2P") networking. For example, the cloud-sharing module 190 may broadcast a transaction to a select number of nodes or hypervisor resources 110, which then further broadcast the transaction to neighboring nodes until each node has received the broadcast. It should be appreciated that each hypervisor resource 110 or physical machine on the cloud may have a cloud-sharing module 190 installed on it, which enables each machine to participate in blockchain validation.

The cloud-sharing module determines which provider from a plurality of providers owns the hypervisor resource, where a first provider is associated with a second anonymous identity and a second provider is associated with a third anonymous identity (block 206). Before broadcasting a transaction, the cloud-sharing module 190 may determine which provider owns the hypervisor resource 110 involved in the transaction. As described above, the cloud-sharing module 190 enables anonymous transactions between providers. Similar to assigning a hypervisor resource 110 an anonymous ID, each provider may also be associated with an anonymous identity. In an example, an anonymous identity may be a random number or string generated by a hashing function. For example, an anonymous ID may be generated from an MD5, SHA-128, or SHA-256 hashing function. Additionally, an anonymous ID may be generated by a program or name generator. For example, the name generator may randomly append an adjective or color (e.g., happy, strong, awesome or blue, green, brown) and a random name (e.g., name of a famous scientist, celebrity, sports figure, animal) to create an anonymous ID, such as "elated_darwin." In an example, the anonymous ID may be appended to a time stamp, a universally unique identifier ("uuid"), etc. It should be appreciated that other random or anonymous ID generation may be used. By having the ability to confirm ownership, the cloud-sharing module advantageously prevents hardware theft in a system that relies on anonymity. In an example, the cloud-sharing module 190 may confirm ownership at various other times such as after broadcasting, during broadcasting, etc.

Then, the cloud-sharing module receives mining information from at least one resource of the pool of hypervisor resources, where the mining information includes a block associated with the transaction and the transaction is represented within the block in a blockchain (block 208). For example, after the transaction is broadcast to the pool of hypervisor resources (e.g., hypervisor resources 110A-D), the cloud-sharing module 190 may receive mining information from a hypervisor resource (e.g., hypervisor resource 110B). In an example, the cloud-sharing module 190 may receive mining information from machines other than those in the pool of hypervisor resources (e.g., hypervisor resource 110A-D). For example, providers may use other machines that communicate with the cloud to mine for solutions to broadcast transactions.

The mining information includes a block associated with the transaction. For example, the transaction is represented within the block in a blockchain. The cloud-sharing module may broadcast several transactions involving several different machines. As used herein, mining information may include transaction information that is transformed into data, such as a random sequence of letters and numbers (e.g., a hash). For example, mining information may include a bundle of transactions in a block. Additionally, the mining information may include the header of the most recent block in the blockchain. Depending on the cloud, the mining information may be required to meet a specific format or size. For example, the solution or block may include a specific nonce, such as a 32-bit field with a value set so that the hash of the block will contain a run of leading zeros. Additionally, machines, such as hypervisor resources, may be mining solutions to multiple transactions at any given time. Once a solution, also referred to as a block, is mined, the block is added to the blockchain to create a record of the transaction. A single block may represent several transactions. For example, a block may be a solution that involves a transaction between two vendors and/or providers (e.g., Provider_1 and Provider_2 or cloud vendor and Provider_1) for hypervisor resource 110D, a second transaction between Provider_1 and Provider_3 for ten hypervisor resources 110, and a third transaction between Provider_2, Provider_3, and Provider_4 for 8 hypervisor resources 110. It should be understood that transactions may include a single hypervisor resource 110 or hundreds of hypervisor resources 110.

The block serves as a solution that validates the updated ownership from each transaction represented within the block. For example, the block solution confirms that multiple requests by different providers for the same resources are not simultaneously granted, and also prevents double spending or transferring resources that a provider does not currently own. As each new block is mined, it is added to the blockchain, which securely and irreversibly defines the provenance of the entire blockchain of machine transactions.

The cloud-sharing module completes the transaction for the first anonymous identity associated with the hypervisor resource between the second anonymous identity and the third anonymous identity (block 210). After receiving the mining information, the cloud-sharing module 190 may complete the transaction for the anonymous identity associated with the hypervisor resource 110 between the anonymous identity associated with Provider_1 and the anonymous identity associated with Provider_2. In an example, the cloud-sharing module 190 may update metadata within the hypervisor resource 100 associated with ownership. For example, the cloud-sharing module may update ownership metadata of the hypervisor resource that indicates Provider_2 is now the current owner. Additionally, the ownership metadata may include the anonymous ID of Provider_2. The cloud-sharing module 190 may also send an asset to Provider_1 for the transaction. In an example, assets may be digital currency, such as a cloud credit. Cloud credits may be used to rent or buy additional resources on the cloud. Similar to resources, assets may be transferred anonymously. For example, the cloud sharing module 190 may send the asset to Provider_1 based solely on the anonymous ID for that provider.

Transactions are validated by the community (e.g., hypervisor resources 110A-D) and other machines communicating with the cloud, thereby eliminating the need for a central authority and reducing overhead, which allows providers to build a cloud that can scale according to needs.

Figure 3A:
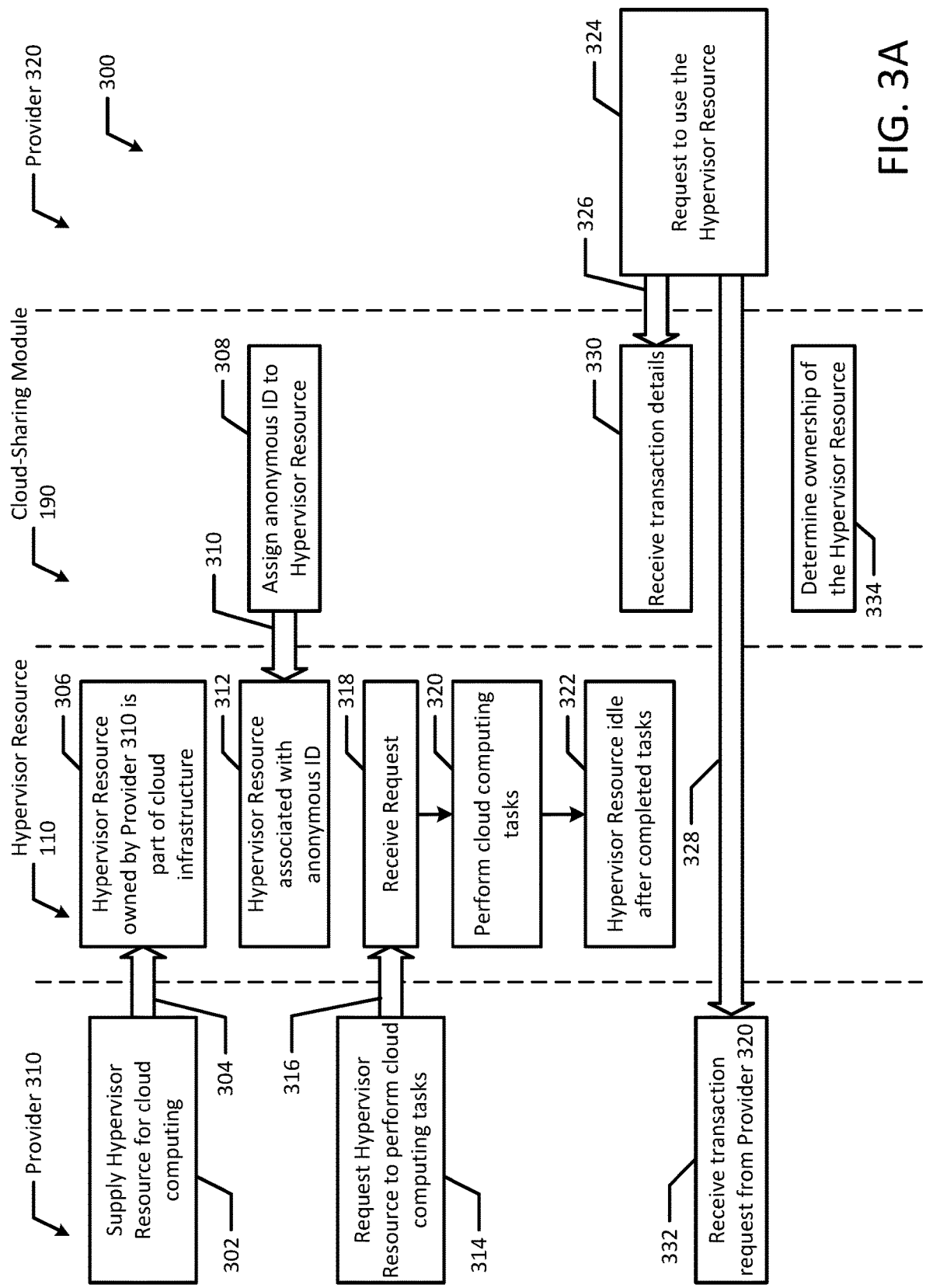
FIGS. 3A and 3B illustrate a flow diagram of an example process for transferring hardware blockchain ownership and access using blockchain according to an example embodiment of the present disclosure.
Figure 3B:
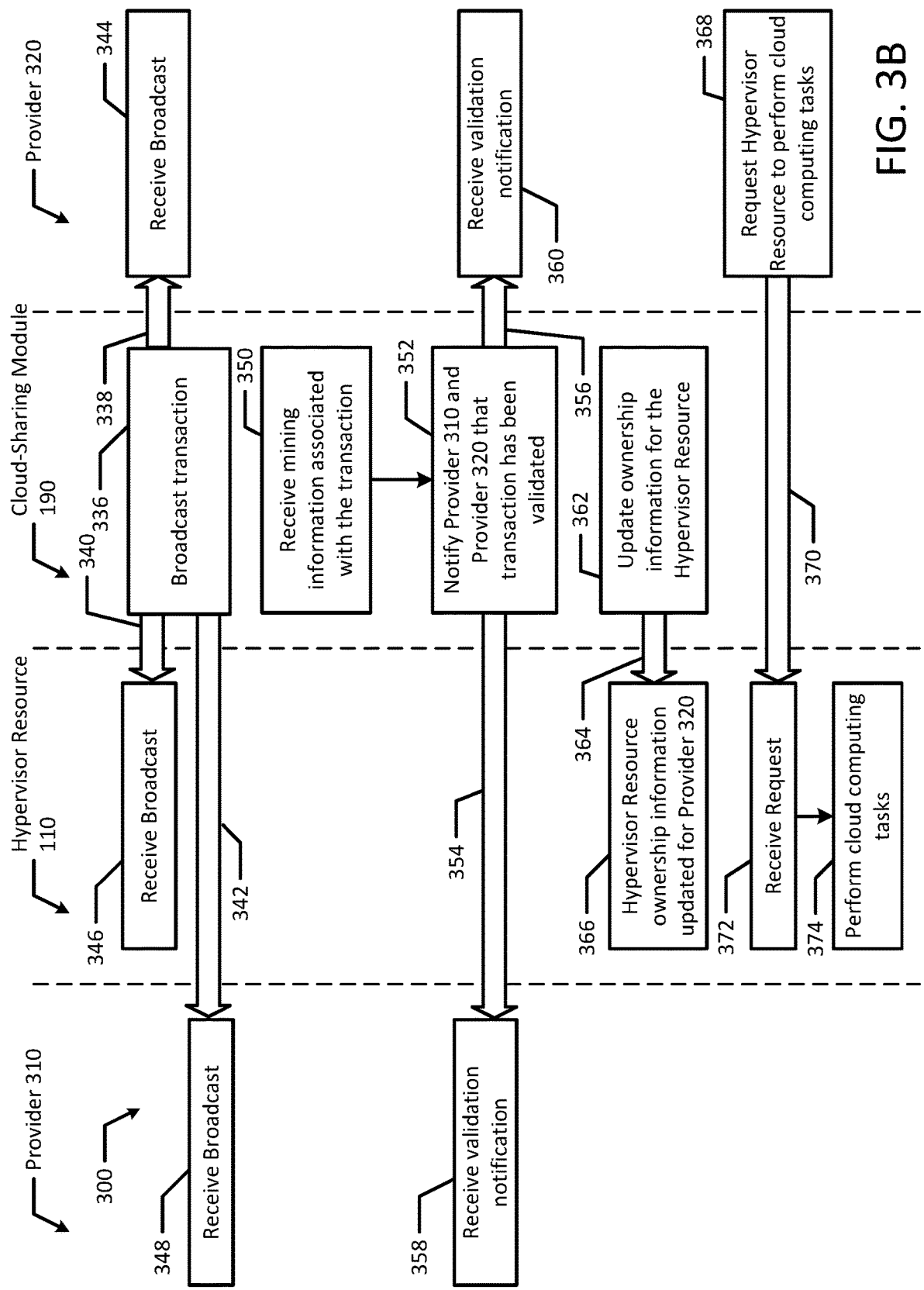

FIGS. 3A and 3B illustrate a flowchart of an example method 300 for transferring hardware ownership and accessing using blockchains. Although the example method 300 is described with reference to the flowcharts illustrated in FIGS. 3A and 3B, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. For example, various providers (e.g., Provider 310, such as an online retailer, and Provider 320, such as a bank), a hypervisor resource 110, and a cloud-sharing module 190 may communicate to perform example method 300.

In the illustrated example, Provider 310 supplies a hypervisor resource 110 for cloud computing (blocks 302 and 304). For example, Provider 310 may add a hypervisor resource 110 to its pool of hypervisor resources (e.g., hypervisor resource 110A-110D) due to forecasted cloud-computing needs. By adding additional hypervisor resources 110, a provider (e.g., an online retailer) can scale up their computer processing capabilities on the cloud. For example, the online retailer may be launching a new product and may expect increased website activity when the product is announced. Similarly, a cloud vendor may supply or add additional hypervisor resources 110 to the cloud. It should be understood that transactions could similarly be conducted between a cloud vendor and a provider (e.g., Provider 310, 320). A hypervisor resource 110 may be a machine and may include hardware devices such as network device, a peripheral component interconnect (PCI) device, storage devices, etc. The hypervisor resource 110 owned by Provider 310 is part of the cloud infrastructure (block 306). After the hypervisor resource 110 is added to the pool of hypervisor resources (e.g., hypervisor resource 110A-110D), the hypervisor resource 110 becomes part of the cloud infrastructure, which may be used as needed. For example, the hypervisor resource 110 may be used for future computing tasks requested by Provider 310. As discussed above, hypervisor resources 110 may be provided by a vendor, which sells or leases the resources to providers. The providers may then re-sell or lease the hypervisor resources 110 amongst themselves. Additionally, providers (e.g., Provider 310, 320) may supply hypervisor resources for cloud computing, which may later be sold or leased to other providers (e.g., Provider 310, 320).

After the hypervisor resource 110 has been added, the cloud-sharing module 190 may assign an anonymous ID to the hypervisor resource 110 (blocks 308 and 310). In an example, the anonymous ID may be a hash that is generated by the cloud-sharing module 190. For example, the cloud-sharing module 190 may utilize a hashing function, such as MD5, SHA-128, SHA-256, or the like to generate an anonymous ID. Additionally, the anonymous ID may be permanent and immutable. Then, the hypervisor resource 110 is associated with the anonymous ID (block 312). In an example, the anonymous ID may a random string of numbers and letters. For example, the anonymous ID (e.g., 140FA9B425ED654F008019C492) may be generated using a SHA-256 hashing function.

Provider 310 may request the hypervisor resource 110 to perform cloud computing tasks (block 314 and 316). For example, Provider 310 may utilize the hypervisor resource 110 along with its current pool of resources (e.g., other hypervisor resources it owns on the cloud) to assist with network traffic and sales of the products that Provider 310 offers to customers as an online retailer. Then, the hypervisor resource 110 may receive the request (block 318). For example, the hypervisor resource 110 and other resources in the pool may receive a request to perform cloud computing tasks. In an example, the tasks may be divided among the shared processing resources.

After receiving the request, the hypervisor resource 110 may perform cloud computing tasks (block 320). For example, the hypervisor resource 110 may perform computer processing tasks, such as processing orders and handling network traffic from the provider's website after a product launch. After completing cloud computing tasks, the hypervisor resource 110 may become idle (block 322). For example, differing consumer trends or additional resources (e.g., newer or faster machines) added to the cloud may result in hypervisor resource 110 becoming idle or unused. Additionally, the initial surge of website traffic or online orders of a new product may start to slow, thereby decreasing the need of cloud resources (e.g., hypervisor resources 110). In an example, Provider 310 may want to rent or sell an unused hypervisor resource 110 to obtain a bartering or monetary benefit. In an example, a digital currency, such as a cloud credit may be exchanged for hypervisor resources 110. The cloud credit may be used to add additional resources to the pool of computing resources, for example, by buying or renting other's machines. In other situations, a hypervisor resource 110 may be rented to Provider 310 for a period of time (e.g., 24 hours). For example, Provider 310 may have additional short term processing needs. In situations where a provider's (e.g., Provider 310) processing needs change, Provider 310 may want to rent the hypervisor resource 110 to a different provider (e.g., Provider 320, such as a bank) for the remaining duration of their lease. For example, Provider 310 may rent the remaining duration (e.g., last four hours) of the lease for the hypervisor resource 110 to Provider 320, such as a bank that providers online banking services to customers via the cloud. By enabling ownership transfer between providers, the cloud-sharing module 190 advantageously provides costs savings by allowing providers (e.g., Provider 310, 320) to rent idle machines by exchanging assets without having to add additional machines to the cloud. Further, the ability to transfer ownership reduces the risk associated with forecasting errors. For example, if provider 310 forecasted a large surge in website traffic after their product launch, they may have added (e.g., provided, bought, or leased) several hypervisor resources 110 prior to the product launch. However, if the product launch may have only been marginally successful, creating little excess website traffic, then Provider 310 may be able to mitigate cloud costs by re-selling or leasing some of the additional hypervisor resources 110 to another provider.

Provider 320 may request to use the hypervisor resource 110 (blocks 324, 326, and 328). For example, available resources may be posted anonymously and providers, such as Provider 320, may request to use (e.g., buy, rent, lease) the hypervisor resource 110. After providers engage in a transaction, the cloud-sharing module 190 may receive the transaction details (block 330). For example, once Provider 310 and Provider 320 decide to enter into a transaction, the transaction details may be provided to the cloud-sharing module 190. In an example, Provider 320 may send the transaction request to the cloud-sharing module 190. The transaction request may be conveyed to the cloud-sharing module anonymously. For example, the cloud-sharing module 190 may only receive the anonymous IDs of the providers and anonymous ID of hypervisor resources 110 involved in the transaction. Additionally, Provider 310 may receive the transaction request from Provider 320 (block 332). For example, after Provider 320 determines it would like to acquire available resources, Provider 320 may anonymously request available resources (e.g., hypervisor resource 110) from Provider 310. Additionally, a cloud resource board (e.g., a virtual bulletin board) may be used to advertise available resources to enable anonymous communication between providers.

The cloud-sharing module 190 may determine the current ownership of the hypervisor resource 110 (block 334). For example, the cloud-sharing module 190 may look up the hypervisor resource's state in the global blockchain. As discussed above, Blockchain systems store the global state of the system across a number of devices (e.g., pool of hypervisor resources 110A-D and other machines interacting with the cloud) in a global blockchain. The blockchain serves as a ledger that is distributed to various nodes or machines (e.g., pool of hypervisor resources 110A-D). For example, the cloud-sharing module 190 may ensure that Provider 310 currently owns hypervisor resource 110 before broadcasting the transaction, which advantageously prevents double spend and/or multiple ownership of hypervisor resources 110. In an example, determining which provider owns the hypervisor resource 110 includes hashing to ensure that the anonymous ID of the hypervisor resource 110 corresponds to an appropriate anonymous ID (e.g., anonymous ID of the provider) in the blockchain.

Then, the cloud-sharing module 190 may broadcast the transaction (blocks 336, 338, and 340). For example, after Provider 310 and Provider 320 agree to enter into a transaction for the hypervisor resource 110, the cloud-sharing module 190 may broadcast the transaction to the pool of hypervisor resources 110A-D and other machines in communication with the cloud. Provider 320, Provider 310, and the pool of hypervisor resources 110A-D may receive the broadcast (block 344, 346, and 348). For example, the transaction may be broadcast to all machines and resources participating with the cloud. In an example, the cloud-sharing module 190 may broadcast the transaction over a network. Additionally, broadcasting may be achieved through P2P networking. For example, the cloud-sharing module 190 may broadcast a transaction to a select number of nodes or hypervisor resources 110, which then further broadcast the transaction to neighboring nodes until each node has received the broadcast.

It should be appreciated that the cloud may include thousands of cloud resources, which may include physical machines and/or virtual machines. The ownership of these resources of these resources (e.g., hypervisor resources) may change by the hundreds or thousands every day. For example, an online retailer or hosting provider may adjust its pool of resources by fifteen thousand machines one day by renting machines from other providers or a cloud vendor. In an example, the cloud-sharing module 190 may collect a list of transactions associated with a plurality of hypervisor resources 110 before broadcasting the transactions. For example, the cloud-sharing module 190 may broadcast transactions at a specific frequency (e.g., every 30 minutes), or may broadcast transactions once a predetermined quantity of transactions or quantity of resources have been requested (e.g., 100 transactions).

Additionally, the cloud-sharing module 190 may receive mining information associated with the transaction (block 350). By using a blockchain algorithm, the pool of hypervisor resources 110A-D and/or other machines interacting with the cloud can come to a consensus on which provider owns which hypervisor resource. For example, a blockchain algorithm may generate a distributed consensus of ownership of the hypervisor resource 110 (and other hypervisor resources associated with other transactions). A validated transaction may be entered into the public ledger or blockchain. The block may represent a solution to a plurality of transactions that are currently pending for the cloud. For example, the block may represent the transaction between Provider 310 and Provider 320 along with multiple other transactions. Due to the high volume of transactions, the solution or block in the blockchain creates a record of ownership after the transactions. For example, the solution may resolve the current requests of several providers for transactions involving hundreds or thousands of resources to ensure that each resource is owned by the correct provider while preventing double spend or contradictory ownership records. In an example, cloud credits may be awarded to the owner of the machine that mines the block for the blockchain, thereby further incentivizing providers to add resources to the cloud. For example, additional resources may increase the cloud computing capabilities of a provider (e.g., Provider 310), such as an online retailer. In some cases, a provider (e.g., Provider 310) may not want to re-sell or lease out idle machines to other providers to ensure they have a buffer of increased capacity. While these resources (e.g., hypervisor resources 110) are idle, but owned by the Provider 310, they may mine for blocks to receive cloud credits.

Then, the cloud-sharing module 190 may notify Provider 310 and Provider 320 that the transaction has been validated (blocks 352, 354, and 356). For example, after receiving the mining information, the cloud-sharing module 190 may send a message to each provider to confirm that the transaction was validated (e.g., solution for the transaction and other transactions was mined to ensure that there was no double spend or ownership contradictions). In another example, the cloud-sharing module 190 may broadcast the latest block in the blockchain to the pool of hypervisor resources (e.g., hypervisor resource 110A-D). Provider 310 may receive the validation notification (block 358). For example, Provider 310 may receive a message from the cloud-sharing module 190. Similarly, Provider 320 may receive the validation notification (block 360). In another example, the cloud-sharing module 190 may indicate that the transaction was validated on the available resources board, which may remove the hypervisor resource 110 from the current listing and send a notification to the appropriate parties.

The cloud-sharing module 190 may update ownership information for the hypervisor resource 110 (blocks 362 and 364). For example, the cloud-sharing module 190 may update the metadata in the hypervisor resource 110 to indicate that Provider 320 is the current owner of the resource. In an example, the metadata may include a key or token that can be checked against the blockchain. Additionally, the cloud-sharing module may give Provider 320 a key or token to use the hypervisor resource 110 with a service set identifier (SSID). For example, the SSID may be a case sensitive, 32 alphanumeric character unique identifier that acts as a password. Then, the hypervisor resource ownership information is updated for Provider 320 (block 366). For example, ownership rights may advantageously be transferred directly from one party to another anonymously without requiring an authority to operate or secure the system. For example, the anonymous ID of Provider 320, which may be an MD5 hashing algorithm value (e.g., 1387AE457F09B76) may be written into ownership metadata of the hypervisor resource 110.

After the ownership has been transferred, Provider 320 may request the hypervisor resource 110 to perform cloud computing tasks (blocks 368 and 370). For example, Provider 320 may utilize the hypervisor resource 110 along with its current pool of resources (e.g., other hypervisor resources it owns on the cloud) to assist with streaming and video sharing traffic from a video sharing mobile application ("app") that Provider 320 offers to customers. For example, during the holidays, the video sharing provider may experience additional use of the video sharing app they provide to customers and may want to rent additional resources from other providers to handle the additional bandwidth. Then, the hypervisor resource 110 may receive the request (block 372). For example, the hypervisor resource 110 and other resources in the pool may receive a request to perform cloud computing tasks associated with the video sharing mobile app. In an example, the tasks may be divided among the shared processing resources. Next, the hypervisor resource 110 may perform the requested cloud computing tasks (block 374). For example, the hypervisor resource 110 may perform computer processing tasks associated with streaming videos shared via the mobile app provided by Provider 320.

Figure 4:
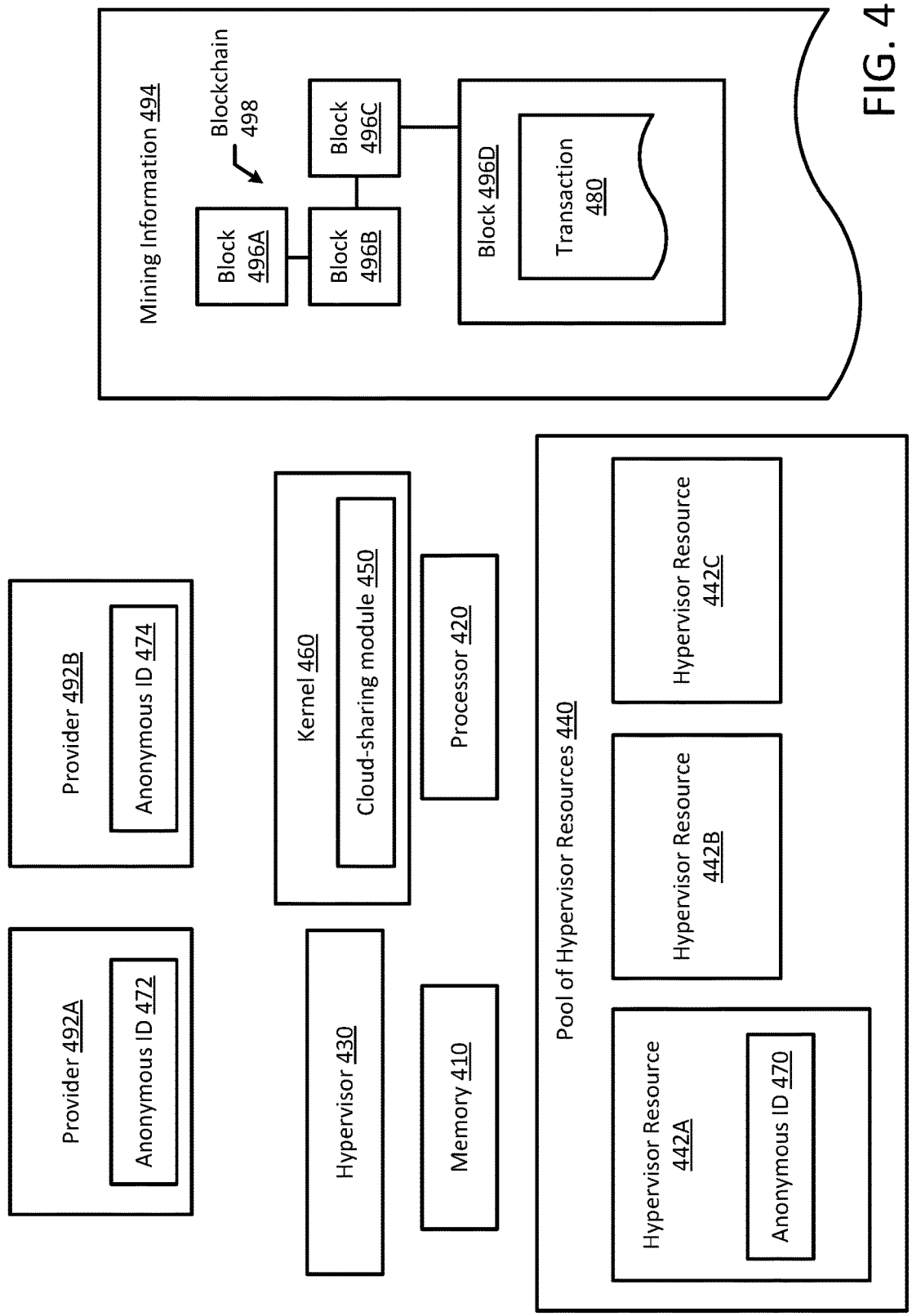
FIG. 4 illustrates a block diagram of an example cooperative cloud infrastructure system according to an example embodiment of the present disclosure.

FIG. 4 is a block diagram of an example cooperative cloud computing infrastructure 400 using blockchains for hardware ownership and access according to an example embodiment of the present disclosure. The cooperative cloud computing infrastructure 400 may include a memory 410, a processor 420 in communication with the memory 410, a hypervisor 430 executing on the processor 420, a pool of hypervisor resources 440, and a cloud-sharing module 450 running in a kernel 460. The cloud-sharing module 450 assigns a first anonymous identity 470 to a hypervisor resource 442A from the pool of hypervisor resources 440. Additionally, the cloud-sharing module 450 broadcasts a transaction 480 for the hypervisor resource 442A and determines which provider from multiple providers owns the hypervisor resource 442A. A first provider 492A is associated with a second anonymous identity 472 and a second provider 492B is associated with a third anonymous identity 474. Additionally, the cloud-sharing module 450 receives mining information 494 from at least one resource of the pool of hypervisor resources 440. The mining information 494 includes a block 496D associated with the transaction 480, and the transaction 480 is represented within the block 496D in a blockchain 498. In an example, the blockchain 498 includes blocks 496A-D. The cloud-sharing module 450 completes the transaction 480 for the first anonymous identity 470 associated with the hypervisor resource 442A between the second anonymous identity 472 and the third anonymous identity 474.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a processor in communication with a memory;
an operating system executing on the processor; and
a privileged software component of the operating system configured to cause:
assigning a first anonymous identity to a shared resource from a pool of shared resources,
broadcasting a transaction for the shared resource,
determining which provider from a plurality of providers owns the shared resource,
receiving information from at least one shared resource of the pool of shared resources, and
completing the transaction for the first anonymous identity between a first provider associated with a second anonymous identity and a second provider associated with a third anonymous identity,
wherein the transaction is broadcast to a select number of nodes.

2. The system of claim 1, wherein at least one asset is sent to the first provider having the second anonymous identity that owns the shared resource.

3. The system of claim 2, wherein the at least one asset includes a cloud credit.

4. The system of claim 1, wherein the pool of shared resources includes physical machines or devices including at least one of a physical processor, a memory device, or an input/output I/O device.

5. The system of claim 1, wherein the pool of shared resources includes one or more ASICs.

6. The system of claim 1, wherein the pool of shared resources includes one or more of FPGAs, DSPs, registers, processor cores, or non-volatile memory devices.

7. The system of claim 1, wherein the pool of shared resources includes one or more nodes.

8. The system of claim 1, wherein the pool of shared resources includes one or more network devices, network adapters, peripheral component interconnect devices, storage devices, disk drives, volatile memory devices, sound adaptors, video adaptors, cameras, printer devices, or displays.

9. The system of claim 1, wherein a list of transactions associated with a plurality of shared resources is collected before broadcasting the transactions, the list of transactions is represented by a block in a blockchain, and the block is broadcast to the pool of shared resources.

10. The system of claim 1, wherein the information includes a block associated with the transaction, and the transaction is represented within the block in a blockchain.

11. A method comprising:
assigning, by a privileged software component of an operating system, a first anonymous identity to a shared resource from a pool of shared resources;
broadcasting a transaction for the shared resource;
determining, by the privileged software component, which provider from a plurality of providers owns the shared resource;
receiving, by the privileged software component, information from at least one shared resource of the pool of shared resources;
completing, by the privileged software component, the transaction for the first anonymous identity between a first provider associated with a second anonymous identity and a second provider associated with a third anonymous identity; and
broadcasting additional transactions once a predetermined quantity of transactions or a predetermined quantity of resources have been requested.

12. The method of claim 11, wherein determining which provider owns the shared resource includes at least one of looking up a state of the shared resource in a global blockchain, or hashing to ensure that the first anonymous identity corresponds to an appropriate anonymous identity in a blockchain, and
wherein completing the transaction includes updating ownership information for the shared resource and validating the transaction across multiple devices.

13. The method of claim 11, wherein the transaction is broadcast through a peer-to-peer network.

14. The method of claim 11, wherein the transaction is broadcast to a select number of nodes.

15. The method of claim 11, further comprising broadcasting the additional transactions at a specific frequency of time.

16. The method of claim 11, further comprising, mining for solutions to broadcast transactions.

17. The method of claim 11, further comprising, confirming ownership of the shared resource at least one of prior to broadcasting the transaction, after broadcasting the transaction, or during broadcasting the transaction.

18. The method of claim 17, wherein confirming ownership of at least one of the shared resource prevents a double spend.

19. A non-transitory machine readable medium storing code, which when executed by a processor, causes a privileged software component of an operating system to:
assign a first anonymous identity to a shared resource from a pool of shared resources;
broadcast a transaction for the shared resource;
determine which provider from a plurality of providers owns the shared resource;
receive information from at least one shared resource of the pool of shared resources;
complete the transaction for the first anonymous identity between a first provider associated with a second anonymous identity and a second provider associated with a third anonymous identity; and
broadcasting additional transactions at a specific frequency of time.

20. The system of claim 1, wherein once a predetermined quantity of transactions or a predetermined quantity of resources have been requested, additional transactions are broadcast.

* * * * *